United States Patent
Roh et al.

(10) Patent No.: US 8,703,342 B2
(45) Date of Patent: Apr. 22, 2014

(54) ELECTRODE ASSEMBLY, RECHARGEABLE BATTERY INCLUDING THE SAME, AND METHOD OF MANUFACTURING AN ELECTRODE THEREOF

(75) Inventors: Sae-Weon Roh, Jyunggi-do (KR); Sung-Soo Kim, Jyunggi-do (KR); Man-Seok Han, Jyunggi-do (KR); Tae-Keun Kim, Jyunggi-do (KR); Jun-Sik Kim, Jyunggi-do (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 336 days.

(21) Appl. No.: 13/064,713

(22) Filed: Apr. 11, 2011

(65) Prior Publication Data
US 2011/0287303 A1    Nov. 24, 2011

(30) Foreign Application Priority Data
May 20, 2010   (KR) .................. 10-2010-0047716

(51) Int. Cl.
*H01M 4/74*   (2006.01)
(52) U.S. Cl.
USPC .............. 429/241; 429/233; 429/231.95
(58) Field of Classification Search
None
See application file for complete search history.

(56) References Cited

U.S. PATENT DOCUMENTS

2001/0008725 A1* 7/2001 Howard ................... 429/94
2009/0136834 A1* 5/2009 Coowar et al. .......... 429/127

FOREIGN PATENT DOCUMENTS

| JP | 11-195432 A | 7/1999 |
|---|---|---|
| JP | 2001-203001 A | 7/2001 |
| JP | 2003-068288 A | 3/2003 |
| JP | 2004-039616 A | 2/2004 |
| KR | 10 2003-0040683 A | 5/2003 |

* cited by examiner

*Primary Examiner* — Patrick Ryan
*Assistant Examiner* — Carmen Lyles-Irving
(74) *Attorney, Agent, or Firm* — Lee & Morse, P.C.

(57) ABSTRACT

An electrode assembly, a rechargeable battery including the same, and a method of manufacturing an electrode thereof, the electrode assembly including a first electrode, the first electrode including a mesh-type first electrode current collector having a plurality of pores, and a first electrode active material layer adhered to the first electrode current collector, wherein an edge active material layer protrudes from a side of the first current collector; a second electrode including a second electrode current collector, and a second electrode active material layer adhered to the second electrode current collector; and a separator interposed between the first and second electrodes.

10 Claims, 11 Drawing Sheets

ELECTRODE ASSEMBLY, RECHARGEABLE BATTERY INCLUDING THE SAME, AND METHOD OF MANUFACTURING AN ELECTRODE THEREOF

BACKGROUND

1. Field

Embodiments relate to an electrode assembly, a rechargeable battery including the same, and a method of manufacturing an electrode thereof.

2. Description of the Related Art

Unlike a primary battery, a rechargeable battery can be iteratively charged and discharged. Low-capacity rechargeable batteries may be used for portable compact electronic apparatuses, e.g., mobile phones, notebook computers, camcorders, etc. High-capacity rechargeable batteries may be used as a power source for, e.g., driving a motor of a hybrid vehicle, etc.

Recently, a high power rechargeable battery that includes a non-aqueous electrolyte having a high energy density has been developed. Such a high power rechargeable battery may be constituted by a large capacity rechargeable battery module in which a plurality of rechargeable batteries are coupled in series in order to use it to drive devices requiring a large amount of power, e.g., motors such as for electric vehicles.

In addition, such a rechargeable battery may include an electrode assembly having a positive electrode, a negative electrode, and a separator interposed between the positive and negative electrodes. The positive and negative electrodes may be respective formed of a current collector formed of a metallic thin film and an active material layer coated on the current collector.

The above information disclosed in this Background section is only for enhancement of understanding of the background of the described technology and therefore it may contain information that does not form the prior art that is already known in this country to a person of ordinary skill in the art.

SUMMARY

Embodiments are directed to an electrode assembly, a rechargeable battery including the same, and a method of manufacturing an electrode thereof, which represent advances over the related art.

It is a feature of an embodiment to provide a rechargeable battery with improved safety.

At least one of the above and other features and advantages may be realized by providing an electrode assembly including a first electrode, the first electrode including a mesh-type first electrode current collector having a plurality of pores, and a first electrode active material layer adhered to the first electrode current collector, wherein an edge active material layer protrudes from a side of the first current collector; a second electrode including a second electrode current collector, and a second electrode active material layer adhered to the second electrode current collector; and a separator interposed between the first and second electrodes.

The edge active material layer may be disposed along an edge of the first electrode.

A width of the edge active material layer may be about 0.5 to about 10 times a thickness of the first electrode current collector.

A thickness of the first electrode may be about 1.1 to about 100 times a thickness of the first electrode current collector.

The second electrode current collector may have a mesh shape, and another edge active material layer may protrude from a side of the second electrode current collector at an edge of the second electrode.

The first electrode, the second electrode, and the separator may be formed in a sheet shape and are provided in plural, and the first electrode and the second electrode may be alternately stacked with the separator interposed therebetween.

At least one of the above and other features and advantages may also be realized by providing a rechargeable battery including an electrode assembly including a first electrode, a second electrode, and a separator interposed between the first and second electrodes, the first electrode including a mesh-type first electrode current collector having a plurality of pores, and a first electrode active material layer adhered to the first electrode current collector, wherein an edge active material layer protrudes from a side of the first current collector, the second electrode including a second electrode current collector, and a second electrode active material layer adhered to the second electrode current collector; a case accommodating the electrode assembly; and a terminal electrically connected to the electrode assembly, the terminal protruding outside of the case.

The edge active material layer may be disposed along an edge of the first electrode.

A width of the edge active material layer may be about 0.5 to about 10 times a thickness of the first electrode current collector.

A thickness of the first electrode may be about 1.1 to about 100 times a thickness of the first electrode current collector.

The second electrode current collector may have a mesh-shape, and another edge active material layer may protrude from a side of the second electrode current collector at an edge of the second electrode.

The first electrode, the second electrode, and the separator may be formed in a sheet shape and are provided in plural, and the first electrode and the second electrode may be alternately stacked with the separator interposed therebetween.

At least one of the above and other features and advantages may also be realized by providing a method of manufacturing an electrode for a rechargeable battery, the method including arranging a plurality of electrode current collectors so as to be separated from each other; adhering an active material to the plurality of electrode current collectors; pressing the electrode current collectors having the active material layer adhered thereto; and cutting the active material layer at a portion thereof where the electrode current collectors are separated to form a plurality of electrodes.

Adhering the active material layer may include adhering an active material layer having a sheet shape to the electrode current collectors.

Adhering the active material layer may include adhering an integrally formed active material layer to both sides of each of the plurality of electrode current collectors.

Cutting the active material layer may include cutting the active material layer to form an edge active material layer protruding from a side of each of the plurality of electrode current collectors.

Each of the plurality of current collectors may have a mesh shape having a plurality of pores therein.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0047716, filed on May 20, 2010, in the Korean Intellectual Property Office, and entitled: "Electrode Assembly, Rechargeable Battery, and Fabricating Method of Electrode Used Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
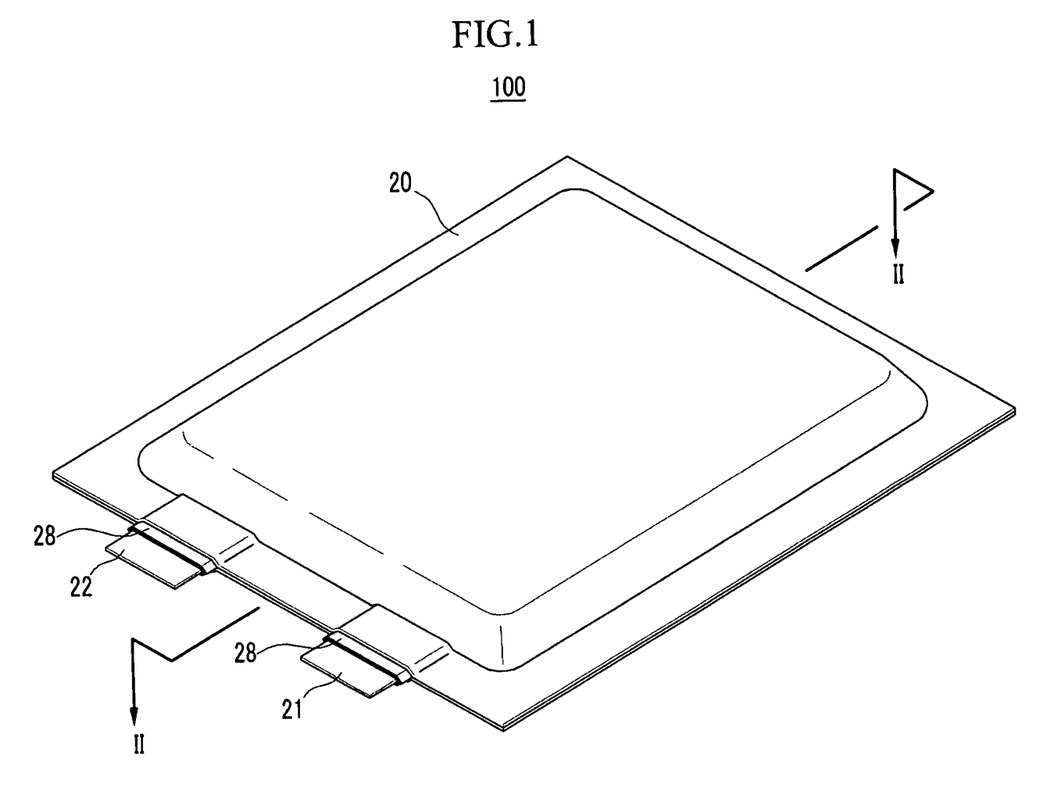
FIG. 1 illustrates a perspective view of a rechargeable battery according to an embodiment.
Figure 2:
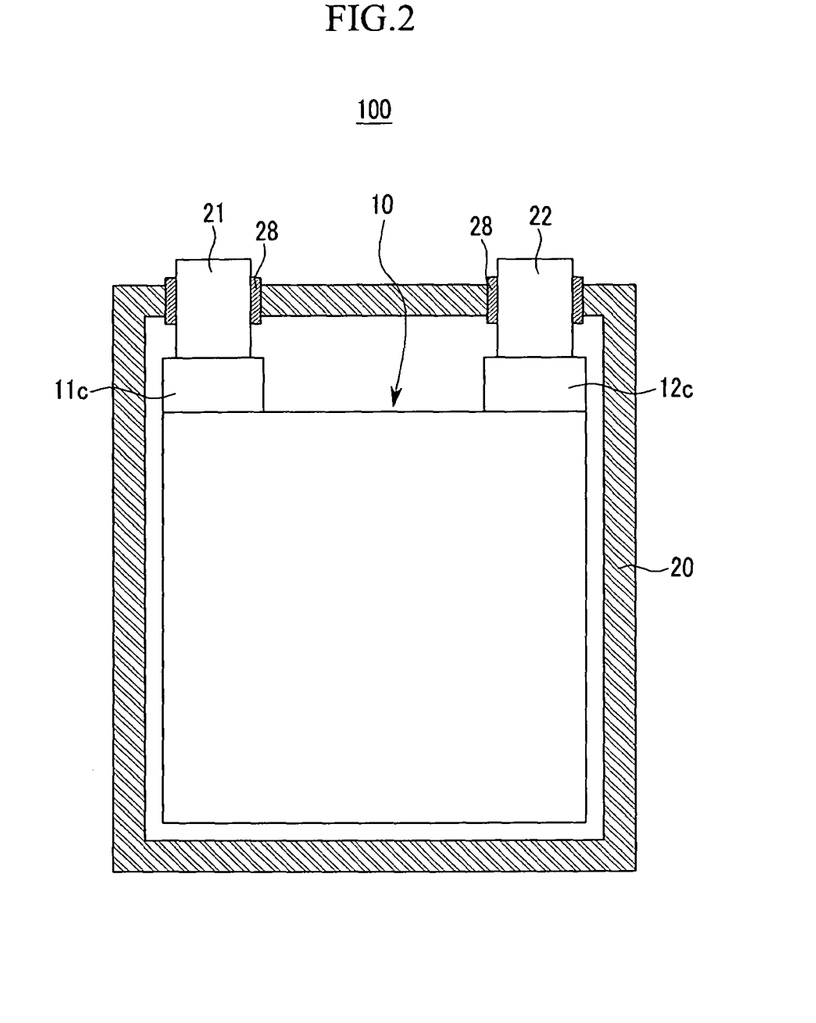
FIG. 2 illustrates a cross-sectional view taken along the line II-II of FIG. 1.

FIG. 1 illustrates a perspective view of a rechargeable battery according to an embodiment. FIG. 2 illustrates a cross-sectional view of FIG. 1, taken along the line II-II.

Referring to FIG. 1 and FIG. 2, a rechargeable battery 100 may include an electrode assembly 10 for performing charging and discharging, a case 20 accommodating the electrode assembly 10, and first and second terminals 21 and 22 electrically connected to the electrode assembly 10.

The case 20 may wholly outline the rechargeable battery 100 and may provide a space for installing the electrode assembly 10 therein. For example, the case 20 may be have a film pouch shape or a rectangular parallelepiped prismatic shape having a one-sided opening for receiving the rectangular parallelepiped electrode assembly 10. The case 20 may be formed with a material including, e.g., a laminating film.

The first terminal 21 and the second terminal 22 may be electrically connected to the electrode assembly 10 and may externally protrude from the case 20.

The first terminal 21 may be electrically connected to a first electrode uncoated region 11c of the electrode assembly 10; and the second terminal 22 may be electrically connected to a second electrode uncoated region 12c of the electrode assembly 10. A sealing member 28 may be provided between the first and second terminals 21 and 22 and the case 20 for sealing. The first and second terminals 21 and 22 according to the present embodiment may protrude in a same direction as one another from the case, but the embodiments are not limited thereto. For example, the first and second terminals 21 and 22 may protrude in directions opposite to each other.

Figure 3:
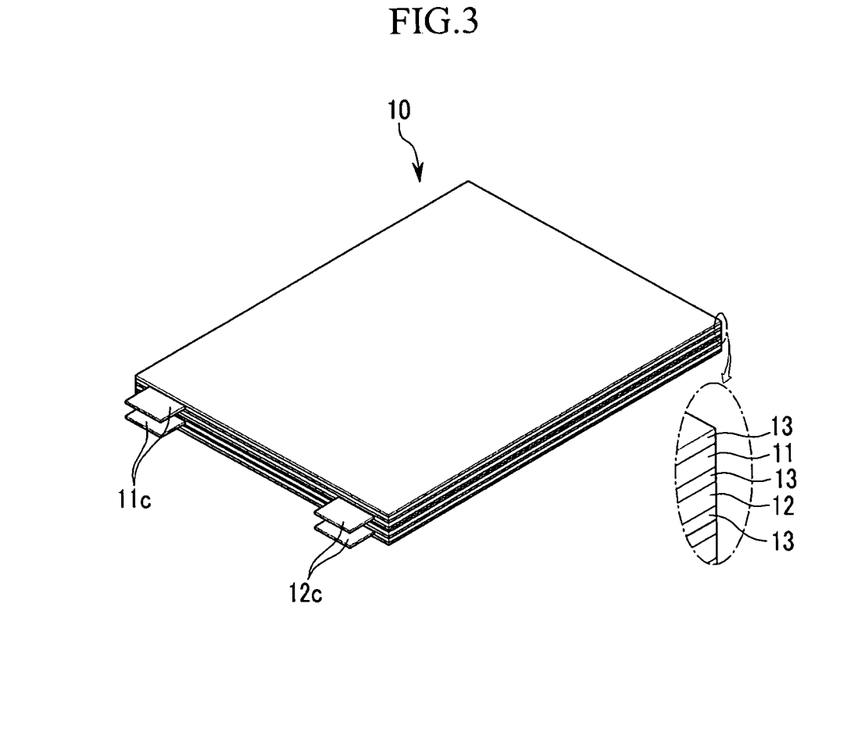
FIG. 3 illustrates is a perspective view of an electrode assembly of the rechargeable battery of FIG. 1.

FIG. 3 illustrates is a perspective view of the electrode assembly of the rechargeable battery of FIG. 1. As shown in FIG. 3, the electrode assembly 10 may include a first electrode 11, a second electrode 12, and a separator 13 interposed between the first and second electrodes 11 and 12. The electrode assembly 10 may have a structure in which a plurality of first and second electrodes are alternately stacked while interposing the separator 13 therebetween.

The separator 13 may be formed from a porous material and may provide a path for electrons and/or ions while insulating between first and second electrodes 11 and 12.

Figure 4:
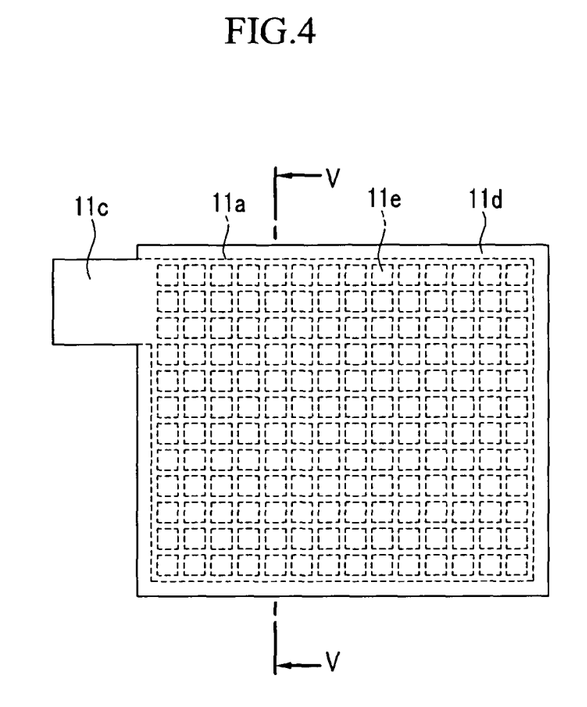
FIG. 4 illustrates a top plan view of a first electrode of the electrode assembly of FIG. 3.
Figure 5:
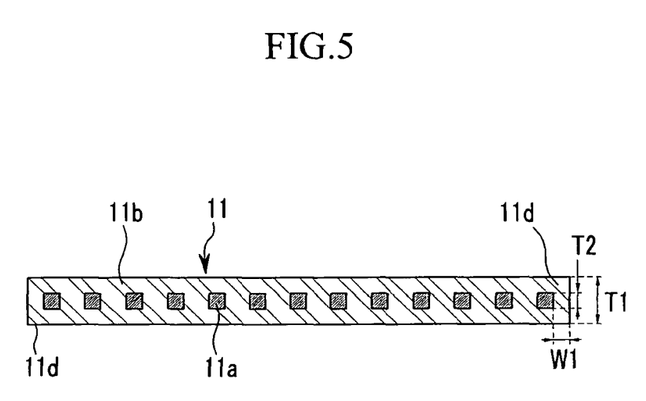
FIG. 5 illustrates a cross-sectional view of FIG. 4, taken along the line V-V.

FIG. 4 illustrates a top plan view of the first electrode of the electrode assembly of FIG. 3. FIG. 5 illustrates a cross-sectional view of FIG. 4, taken along the line V-V.

Referring to FIG. 4 and FIG. 5, the first electrode 11 may include a first electrode current collector 11a and a first electrode active material layer 11b adhered to both sides of the first electrode current collector 11a.

The first electrode current collector 11a may be a mesh-type current collector including a plurality of pores 11e. The first electrode current collector 11a may be formed of a rectangular plate shaped material including, e.g., aluminum and/or stainless steel.

The first electrode active material layer 11b may be formed of a positive active material and may have a sheet shape. Accordingly, the first electrode 11 may become the positive electrode and the second electrode 12 may become the negative electrode. However, the embodiments are not limited thereto; and the first electrode 11 may be the negative electrode and the second electrode 12 may be the positive electrode.

The first electrode active material layer 11b may be adhered to both sides of the first electrode current collector 11a using a laminating method. In this case, the first electrode active material layer 11b may be inserted through the pores 11e of the first electrode current collector 11a and thus the first electrode active material layer 11b and the first electrode current collector 11a may be sealed.

The first electrode uncoated region 11c may be formed at an, e.g., upper, end of the first electrode 11; and the first terminal 21 may be welded thereto. The first electrode uncoated region 11c may not be adhered with the first electrode active material layer 11b; and the first electrode current collector 11a may be exposed thereto.

An edge active material layer 11d protruding from or beyond a side of the first electrode current collector 11a may be formed at an edge of the first electrode 11. The edge active material layer 11d may protrude more to the outside than, i.e., may extend beyond, a side of the first electrode current collector 11a, and may extend along the edge or edges of the first electrode 11.

As shown in FIG. 5, a width W1 of the edge active material layer 11d may be about 0.5 to about 10 times a thickness T2 of the current collector 11a.

Maintaining the width W1 of the edge active material layer 11d at about 0.5 times the current collector 11a thickness T2 or greater may help ensure that a burr is not generated and that a short-circuit does not occur. Maintaining the width W1 at about 10 times the current collector 11a thickness T2 or less may help ensure ease of maintaining the electrode shape and the distance between the edge active material layer and the current collector so that deterioration of current collecting efficiency is reduced or prevented.

A thickness T1 of the first electrode 11 may be about 1.1 times to about 100 times the thickness T2 of the first electrode current collector 11a.

When the first electrode active material layer 11b is adhered to mesh-type the first electrode current collector 11a, as in the present embodiment, a thickness of the edge active material layer 11d and a thickness of a portion including the first electrode current collector 11a may be equivalent to each other so that an entire thickness of the first electrode 11 may be uniform. In addition, since a side of the first electrode current collector 11a may be covered by the edge active material layer 11d, a burr may not be generated in the side of the first electrode current collector 11a. Accordingly, a short-circuit between a burr of the first electrode current collector 11la and a burr of the second electrode current collector 12a may be prevented so that safety of the rechargeable battery is advantageously improved.

In addition, preventing generation of the burr may help prevent damage to the separator 12 during assembly and may prevent occurrence of a failure during the assembling process. Therefore, according to the present embodiment, the assembly of the rechargeable battery and the electrode assembly may be improved by preventing such a failure.

Figure 6:
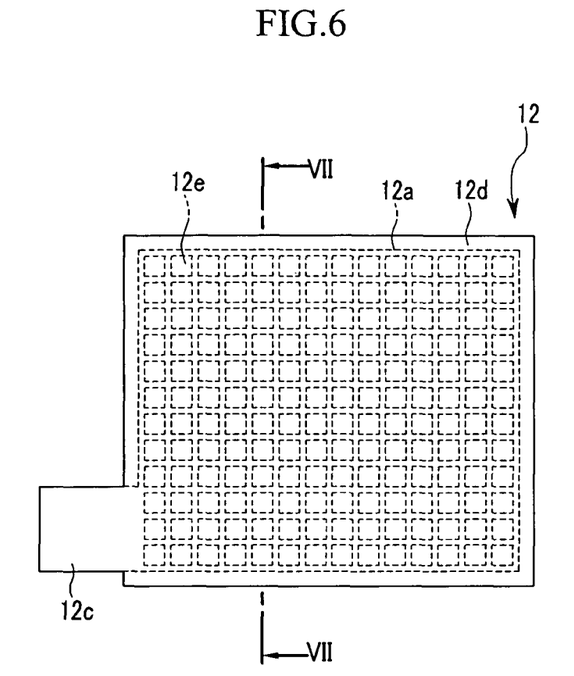
FIG. 6 illustrates a top plan view of a second electrode of the electrode assembly of FIG. 3.
Figure 7:
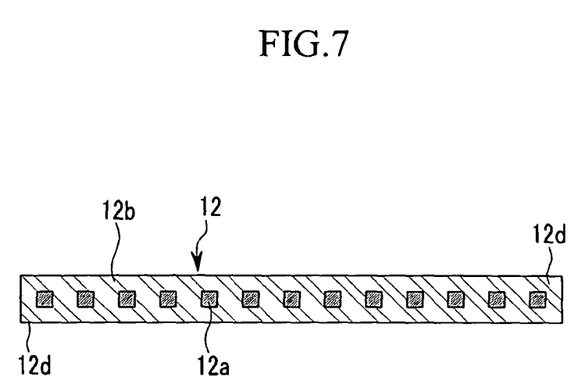
FIG. 7 illustrates a cross-sectional view taken along the line VII-VII of FIG. 6.

FIG. 6 illustrates a top plan view of the second electrode of the electrode assembly of FIG. 3. FIG. 7 illustrates a sectional view of FIG. 6, taken along the line VII-VII.

As shown in FIG. 6 and FIG. 7, the second electrode 12 may include a second electrode current collector 12a and a second electrode active material layer 12b adhered to both sides of the second electrode current collector 12a.

The second electrode current collector 12a may be a mesh-type current collector including a plurality of pores 12e. In addition, the second electrode current collector 12a may be formed of a porous rectangular plate shaped material including, e.g., copper, stainless steel, and/or aluminum. In the present embodiment, the second electrode active material layer 12b may be formed of a negative active material and may have a sheet shape.

The second electrode uncoated region 12c may be formed at an, e.g., upper, end of the second electrode; and the second terminal 22 may be welded to the second electrode uncoated region 12a. The second electrode active material layer 12b may not be formed in the upper end of the second electrode 12; and the second electrode current collector 12a may be exposed to the second electrode uncoated region 12c. The second electrode active material layer 12b may be adhered on the second electrode current collector 12a using, e.g., a laminating method.

An edge active material layer 12d protruding from a side of the second electrode current collector 12a may be formed at an edge of the second electrode 12. The edge active material layer 12d may protrude more to the outside than, i.e., may extend beyond, a side of the second electrode current collector 12a, and may extend along the edge of the second electrode 12.

The edge active material layer 12d of the second electrode 12 may have the same structure of the edge active material layer 11d of the first electrode 11, and therefore a repeated description thereof will be omitted.

FIG. 8A to FIG. 8D illustrate stages in a manufacturing method of an electrode according to an embodiment.

Since the first electrode 11 and the second electrode 12 are manufactured using the same method, only the manufacturing of the first electrode 11 will be described.

A manufacturing method according to the present embodiment may include adhering an integrally formed first electrode active material layer 11b to separately arranged first electrode current collectors 11a, pressing the first electrode current collector 11a to which the first electrode active material layer 11b is adhered, and cutting the first electrode active material layer 11b to separate a plurality of first electrodes 11.

Figure 8A:
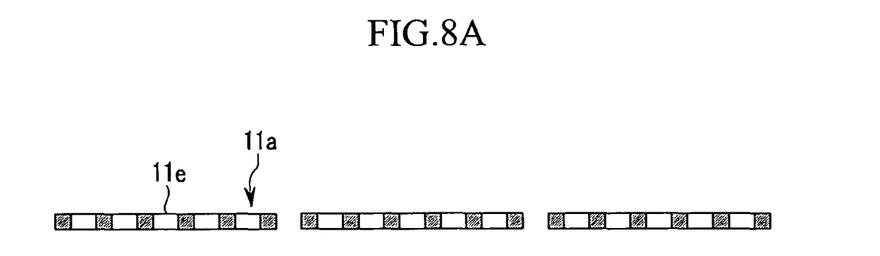
FIG. 8A to FIG. 8D illustrate stages in a manufacturing method of an electrode according to an embodiment.
Figure 8B:
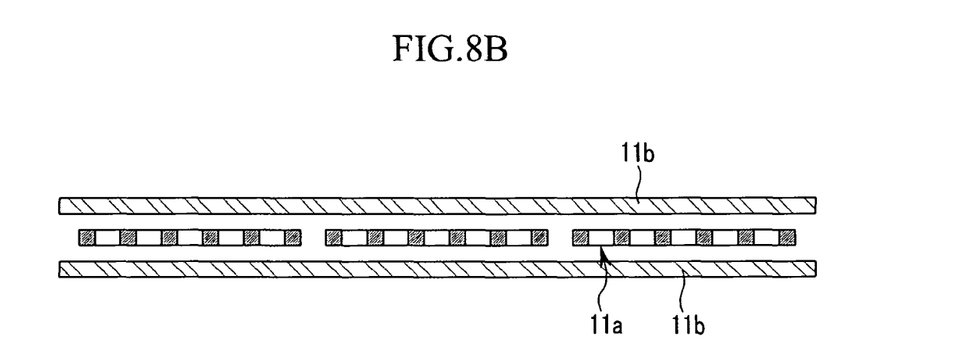

As shown in FIG. 8A and FIG. 8B, in the active material layer adhering step, the plurality of first electrode current collectors 11a may be separately arranged. Thus, an integrally formed first electrode active material layer 11b may be adhered to both sides of the respective first electrode current collectors 11a. Here, the first electrode current collector 11a may be a mesh-type current collector including a plurality of pores 11e; and the plurality of first electrode current collectors 11a may be arranged at a predetermined distance from each other.

The sheet-type first electrode active material layer 11b may be adhered to the plurality of first electrode current collectors 11a. The integrally formed first electrode active material layer 11b may be adhered to both sides of each first electrode current collector 11a, i.e., one first electrode active material layer 11b may be adhered to the plurality of first electrode current collectors 11a.

Figure 8C:
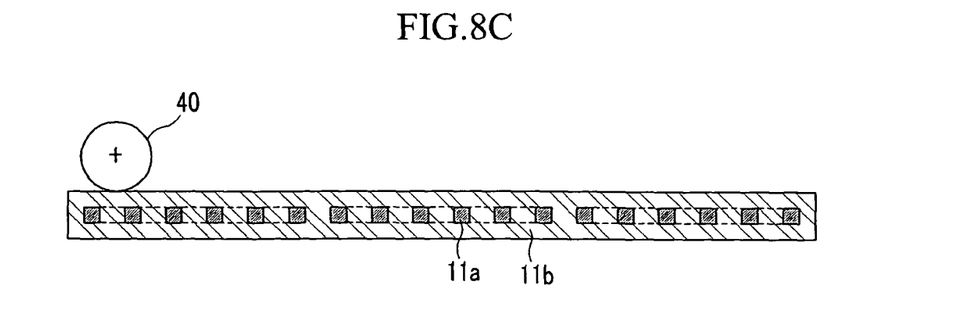

As shown in FIG. 8C, in the pressing step, the first electrode current collector 11a to which the first electrode active material layer 11b is adhered may be pressed by using, e.g., a roller 40 or the like. In an implementation, the first electrode active material layer 11b and the first electrode current collector 11a may be hot-pressed to cause the first electrode active material layer 11b to be inserted through the pores 11e.

Figure 8D:
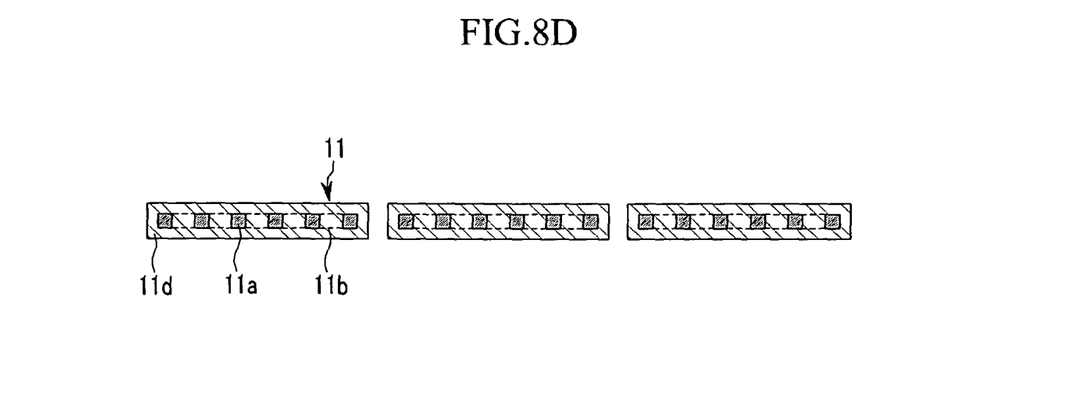

As shown in FIG. 8D, in the cutting step, the first electrode active material layer 11b may be cut at a portion where the first electrode current collectors 11a are separated in order to separate the first electrodes 11. Since portions where the first electrode current collectors 11a are separated may be cut, only the first electrode active material layer 11b may be cut and the first electrode current collector 11a is not cut. In addition, the cutting step may include forming the edge active material layer 11d protruding from the side of the first electrode current collector 11a by cutting a point separated by a predetermined length from the side of the first electrode current collector 11a.

As described above, since the first electrode current collector 11a may not be cut during the cutting process, even though a plurality of electrodes 11 may be manufactured all together and then cut, generation of the undesirable burr may be prevented.

Figure 9:
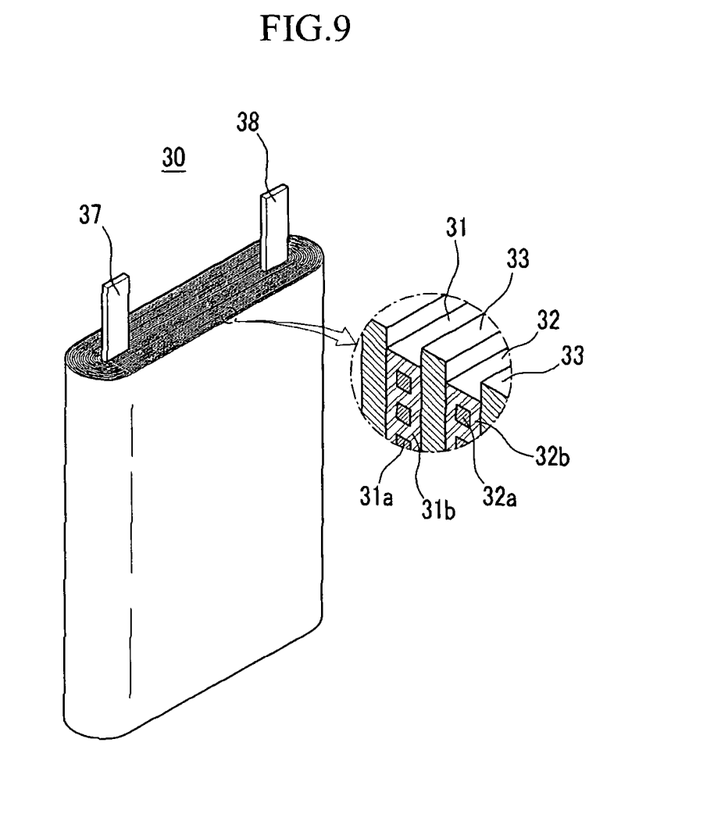
FIG. 9 illustrates a perspective view of an electrode assembly according to another embodiment.
Figure 10:
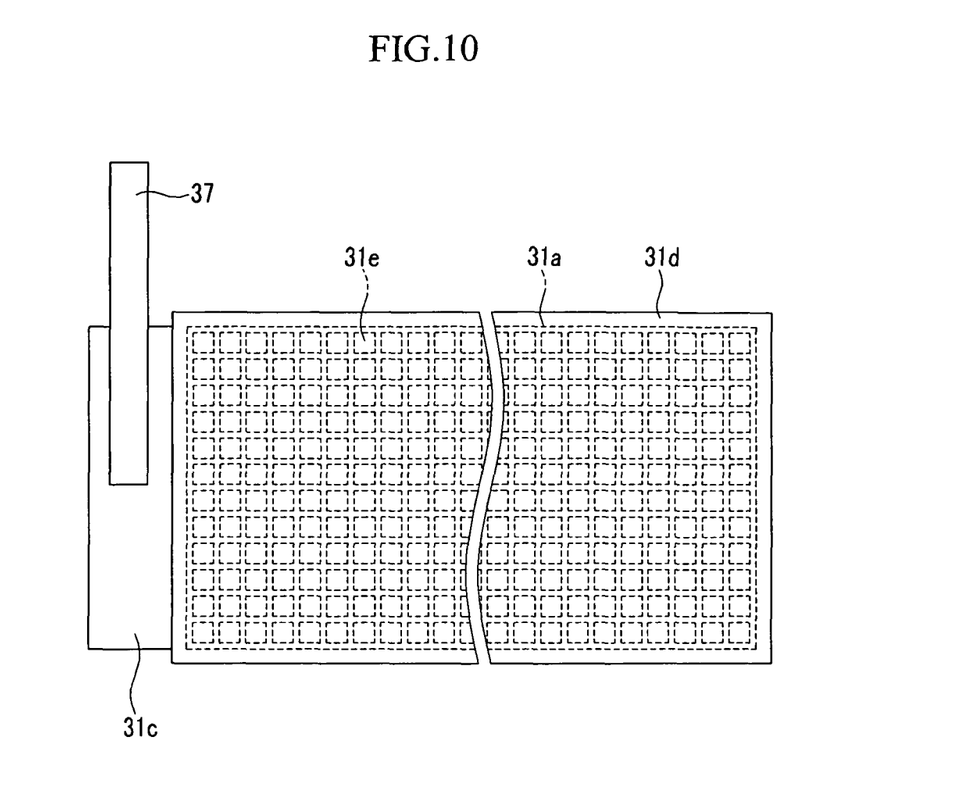
FIG. 10 illustrates a top plan view of a first electrode of the electrode assembly of FIG. 9.

FIG. 9 illustrates a perspective view of an electrode assembly according to another embodiment. FIG. 10 illustrates a top plan view of a first electrode of the electrode assembly of FIG. 9.

Referring to FIG. 9 and FIG. 10, an electrode assembly 30 according to the present embodiment may include a first electrode 31, a second electrode 32, and a separator 33 interposed between the first and second electrodes 31 and 32.

The first electrode 31 may include a first electrode current collector 31a and a first electrode active material layer 31b on the first electrode current collector 31a. The second electrode 32 may include a second electrode current collector 32a and a second electrode active material layer 32b adhered to the second electrode current collector 32a. A first current collecting tab 37 may be adhered to a first electrode uncoated region 31c of the first electrode current collector 31a; and a second current collecting tab 38 may be adhered to a second electrode uncoated region of the second electrode current collector 32a.

Since the first electrode 31 and the second electrode 32 have the same structure, a repeated detailed description of the second electrode 32 will be omitted.

The first electrode current collector 31a may have a mesh shape including a plurality of pores 31e formed therein and may have a band shape extending in one direction. In addition, an edge active material layer 31d protruding more to the outside than, i.e., extending beyond, a side of the first electrode current collector 31a may be formed at an edge of the first electrode 31. Thus, the edge active material layer 31d may extend along the edge of the first electrode 31.

The second electrode 32 and the separator 33 may have the band shape extending in the one direction. Thus, the electrode assembly 30 may be formed by winding the first and second electrodes 31 and 32 while interposing the separator 33 therebetween.

According to the present embodiment, the edge active material layers 31d and 32d may be formed at the edges of the first and second electrodes 31 and 32 so that a short-circuit caused by a burr of the current collector 31a or 32a may be prevented.

According to an embodiment current collector coated with an active material may be cut into a plurality of electrodes while preventing generation of a burr during the cutting of the current collector. Preventing generation of the burr may help prevent a short-circuit between the positive current collector and the negative current collector. In addition, damage to the separator by the burr may be prevented. That is, preventing generation of the burr may prevent a failure in the assembling process of the electrode assembly.

According to an embodiment, the edge active material layer may be formed to prevent generation of the burr in the current collector and thus prevent a short-circuit of the current collector.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electrode assembly, comprising:
a first electrode, the first electrode including:
   a mesh-type first electrode current collector having a plurality of pores, and
   a first electrode active material layer adhered to the first electrode current collector, wherein an edge active material layer protrudes from a side of the first current collector;
a second electrode including:
   a second electrode current collector, and
   a second electrode active material layer adhered to the second electrode current collector; and
a separator interposed between the first and second electrodes,
wherein a width of the edge active material layer is about 0.5 to about 10 times a thickness of the first electrode current collector.

2. The electrode assembly as claimed in claim 1, wherein the edge active material layer is disposed along an edge of the first electrode.

3. The electrode assembly as claimed in claim 1, wherein a thickness of the first electrode is about 1.1 to about 100 times a thickness of the first electrode current collector.

4. The electrode assembly as claimed in claim 1, wherein:
the second electrode current collector has a mesh shape, and
another edge active material layer protrudes from a side of the second electrode current collector at an edge of the second electrode.

5. The electrode assembly as claimed in claim 1, wherein:
the first electrode, the second electrode, and the separator are formed in a sheet shape and are provided in plural, and
the first electrode and the second electrode are alternately stacked with the separator interposed therebetween.

6. A rechargeable battery, comprising:
an electrode assembly including a first electrode, a second electrode, and a separator interposed between the first and second electrodes,
the first electrode including:
   a mesh-type first electrode current collector having a plurality of pores, and
   a first electrode active material layer adhered to the first electrode current collector, wherein an edge active material layer protrudes from a side of the first current collector,
the second electrode including:
   a second electrode current collector, and
   a second electrode active material layer adhered to the second electrode current collector;
a case accommodating the electrode assembly; and
a terminal electrically connected to the electrode assembly, the terminal protruding outside of the case,
wherein a width of the edge active material layer is about 0.5 to about 10 times a thickness of the first electrode current collector.

7. The rechargeable battery as claimed in claim 6, wherein the edge active material layer is disposed along an edge of the first electrode.

8. The rechargeable battery as claimed in claim 6, wherein a thickness of the first electrode is about 1.1 to about 100 times a thickness of the first electrode current collector.

9. The rechargeable battery as claimed in claim 6, wherein:
the second electrode current collector has a mesh-shape, and
another edge active material layer protrudes from a side of the second electrode current collector at an edge of the second electrode.

10. The rechargeable battery as claimed in claim 6, wherein:
the first electrode, the second electrode, and the separator are formed in a sheet shape and are provided in plural, and
the first electrode and the second electrode are alternately stacked with the separator interposed therebetween.

* * * * *